United States Patent
Akhter et al.

(10) Patent No.: US 9,059,926 B2
(45) Date of Patent: Jun. 16, 2015

(54) PERFORMANCE ANALYSIS OF VIRTUAL PRIVATE NETWORK SEGMENT ON A PER FLOW BASIS

(71) Applicant: CISCO TECHNOLOGY, INC., San Jose, CA (US)

(72) Inventors: Aamer Saeed Akhter, Cary, NC (US); Plamen Nedeltchev Nedeltchev, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 106 days.

(21) Appl. No.: 13/872,980

(22) Filed: Apr. 29, 2013

(65) Prior Publication Data

US 2014/0321315 A1    Oct. 30, 2014

(51) Int. Cl.
*H04L 12/26* (2006.01)
*H04L 12/24* (2006.01)
*H04L 12/46* (2006.01)

(52) U.S. Cl.
CPC .......... *H04L 41/142* (2013.01); *H04L 43/0894* (2013.01); *H04L 12/2678* (2013.01); *H04L 43/10* (2013.01); *H04L 43/04* (2013.01); *H04L 12/4633* (2013.01)

(58) Field of Classification Search
CPC ......... H04L 43/04; H04L 43/10; H04L 43/12; H04L 47/00; H04L 45/00; H04L 12/4633; H04L 43/00; H04L 43/50; H04L 41/0654; H04L 12/2678; H04L 69/02; H04L 69/22; H04L 43/0894; H04L 41/12; H04L 47/10
USPC .............. 370/241, 241.1, 244–245, 248–249, 370/252, 353–356, 389, 392, 400–401, 370/428–429, 217; 709/244, 224, 250, 223; 713/150, 153, 160; 714/2
See application file for complete search history.

(56) References Cited

U.S. PATENT DOCUMENTS

| | | | |
|---|---|---|---|
| 6,765,904 B1 | 7/2004 | Anandakumar et al. | |
| 6,990,086 B1 | 1/2006 | Holur et al. | |
| 7,305,492 B2 | 12/2007 | Bryers et al. | |
| 7,496,044 B1 | 2/2009 | Wing | |

(Continued)

FOREIGN PATENT DOCUMENTS

EP    2530892    12/2012

OTHER PUBLICATIONS

Akhter, A., "User Traffic Analysis by Medianet Performance Monitor," Cisco Blog, Borderless Networks, Feb. 2011, 3 pages http://blogs.cisco.com.

(Continued)

*Primary Examiner* — Edan Orgad
*Assistant Examiner* — Ivan O Latorre
(74) *Attorney, Agent, or Firm* — Patent Capital Group

(57) ABSTRACT

A method is provided in one example embodiment and includes generating at a first network device Virtual Private Network ("VPN") encapsulated packets with anonymized headers; maintaining a table mapping the anonymized headers to original headers of the VPN encapsulated packets; receiving a trace request from an initiator; generating from the received trace request an out-of-tunnel trace request toward a second network device via at least one intermediate network device using the anonymized headers; and forwarding the received trace request as an in-tunnel trace request through a VPN tunnel.

20 Claims, 6 Drawing Sheets

(56) References Cited

U.S. PATENT DOCUMENTS

| | | | |
|---|---|---|---|
| 7,519,006 | B1 | 4/2009 | Wing |
| 7,660,254 | B2 | 2/2010 | Vasseur et al. |
| 7,693,055 | B2 | 4/2010 | Vasseur et al. |
| 7,729,267 | B2 | 6/2010 | Oran et al. |
| 7,746,796 | B2 | 6/2010 | Swallow et al. |
| 7,765,294 | B2 | 7/2010 | Edwards et al. |
| 7,920,466 | B2 | 4/2011 | Vasseur |
| 8,085,674 | B2 | 12/2011 | Damm et al. |
| 8,111,627 | B2 | 2/2012 | McCallum et al. |
| 8,125,897 | B2 | 2/2012 | Ray et al. |
| 8,199,658 | B2 | 6/2012 | Vasseur et al. |
| 8,279,749 | B2 | 10/2012 | Vasseur et al. |
| 8,351,329 | B2 | 1/2013 | Pignataro et al. |
| 8,369,213 | B2 | 2/2013 | Vasseur et al. |
| 8,374,095 | B2 | 2/2013 | Boutros et al. |
| 8,837,300 | B2 * | 9/2014 | Nedeltchev et al. ........... 370/241 |
| 2003/0235209 | A1 * | 12/2003 | Garg et al. .................... 370/468 |
| 2006/0262783 | A1 | 11/2006 | Nedeltchev |
| 2007/0025241 | A1 * | 2/2007 | Nadeau et al. ................ 370/229 |
| 2007/0147378 | A1 | 6/2007 | Elgebaly et al. |
| 2008/0052387 | A1 * | 2/2008 | Heinz et al. ................... 709/223 |
| 2008/0080507 | A1 * | 4/2008 | Swallow et al. ............... 370/392 |
| 2009/0225652 | A1 | 9/2009 | Vasseur et al. |
| 2010/0118711 | A1 * | 5/2010 | Cankaya et al. .............. 370/248 |
| 2011/0087878 | A1 | 4/2011 | Weis et al. |
| 2011/0317696 | A1 | 12/2011 | Aldrin et al. |
| 2012/0008498 | A1 | 1/2012 | Clemm et al. |
| 2012/0016981 | A1 | 1/2012 | Clemm et al. |
| 2012/0026877 | A1 | 2/2012 | Rajappan et al. |
| 2012/0063314 | A1 | 3/2012 | Pignataro et al. |
| 2012/0144013 | A1 | 6/2012 | Eckert |
| 2012/0185775 | A1 | 7/2012 | Clemm et al. |
| 2012/0314573 | A1 | 12/2012 | Edwards |
| 2013/0091349 | A1 | 4/2013 | Chopra |
| 2013/0103739 | A1 | 4/2013 | Salquiero |
| 2013/0191628 | A1 | 7/2013 | Nedeltchev et al. |
| 2013/0326049 | A1 * | 12/2013 | Talton .......................... 709/224 |
| 2014/0029451 | A1 * | 1/2014 | Nguyen ........................ 370/252 |

OTHER PUBLICATIONS

Akhter, Aamer, "Mediatrace: A Better Traceroute that Does the Walking for You," Cisco Blog: Borderless Networks, Cisco.com, Mar. 17, 2011, 7 pages http://blogs.cisco.com/borderless/mediatrace/.

Donnet, et al., "Revealing MPLS Tunnels Obscured from Traceroute," Computer Communication Review, vol. 42, No. 2, Apr. 2012, pp. 88-93, ACM SIGCOMM.

Kent, et al., "IP Encapsulating Security Payload (ESP)," Network Working Group, RFC 4303, Dec. 2005, 45 pages.

Kent, et al., "Security Architecture for the Internet Protocol," Network Working Group, RFC 2401, Nov. 1998, 67 pages.

Mills, D.L., "DCN Local-Network Protocols," Network Working Group RFC891, Dec. 1983, 27 pages; http://tools.ietf.org/html/rfc891.

Nichols, Kathleen, et al., "A Modern AQM is Just One Piece of the Solution to Bufferbloat, ACMQUEUE: Controlling Queue Delay," Networks, 15 pages © 2012 ACM 1542-7730/12/0400 http://queue.acm.org/detail.cfm?id=2209336.

Postel, J., "Internet Control Message Protocol: DARPA Internet Program Protocol Specification," Network Working Group RFC792, Sep. 1981, 22 pages http://tools.ietf.org/pdf/rfc792.pdf.

USPTO Nov. 21, 2014 Final Office Action from U.S. Appl. No. 13/357,689.

USPTO Apr. 11, 2014 Non-Final Office Action from U.S. Appl. No. 13/357,689.

* cited by examiner

US 9,059,926 B2

PERFORMANCE ANALYSIS OF VIRTUAL PRIVATE NETWORK SEGMENT ON A PER FLOW BASIS

TECHNICAL FIELD

This disclosure relates generally to virtual private networks ("VPNs") and, more particularly, to techniques for enabling performance analysis of a VPN segment on a per flow basis.

BACKGROUND

Traditional methods of monitoring network performance include various performance monitoring tools that employ a variety of protocols such as Internet Control Message Protocol ("ICMP") Traceroute, Multiprotocol Label Switching Operations Administration Maintenance ("MPLS-OAM"), Ethernet Operations Administration Maintenance ("E-OAM"), Cisco Discovery Protocol ("CDP"), and Link Layer Discovery Protocol ("LLDP"). These tools and protocols enable the path discovery and real-time monitoring of time sensitive applications, such as voice and video, through a computer network. In conventional Q.931 networks, it was fairly simple to trace a call flow end-to-end and determine the quality of the call; however, tunneling protocols, which encapsulate network traffic between end-points of a secure connection, or tunnel (e.g., virtual private network (VPN) tunnels), impede performance monitoring on intermediate nodes along the tunnel since the tunnel essentially hides the traffic, thereby making individual flows effectively invisible to intermediate nodes. In particular, data traffic enters the tunnel via a node designated as the "head" of the tunnel and exits the tunnel via a node designated as the "tail" of the tunnel. The traffic passes through intermediate nodes within the tunnel and is typically hidden from monitoring due to the nature of tunnels (e.g., VPNs). As a result, tunnels limit the ability of performance tools to expose and monitor traffic over the intermediate nodes.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes generating (e.g., at a first network device) Virtual Private Network ("VPN") encapsulated packets with anonymized headers. In this context, the term 'anonymized headers' includes any data segment in which the anonymity (e.g., associated with any portion of the packet, its address, its formatting, its fields, etc.) is being obscured, protected, maintained as confidential, or otherwise hidden (in part or in full) in any fashion. The method can also include maintaining (e.g., storing, managing, collecting, etc.) a table that maps the anonymized headers to original headers of the VPN encapsulated packets. The method can also include receiving a trace request from an initiator. The 'trace request' can be associated with any appropriate signaling, messaging, data exchange, etc., associated with a route path, trace, mapping, etc., while the 'initiator' can be associated with any entity, device, network element, tool, module, hardware, protocol, software, etc. in the network. The method further includes generating an out-of-tunnel trace request toward a second network device (e.g., via at least one intermediate network device) using the anonymized headers; and forwarding (e.g., communicating, sending, transmitting, etc.) the received trace request as an in-tunnel trace request through a VPN tunnel.

Example Embodiments

Figure 1:
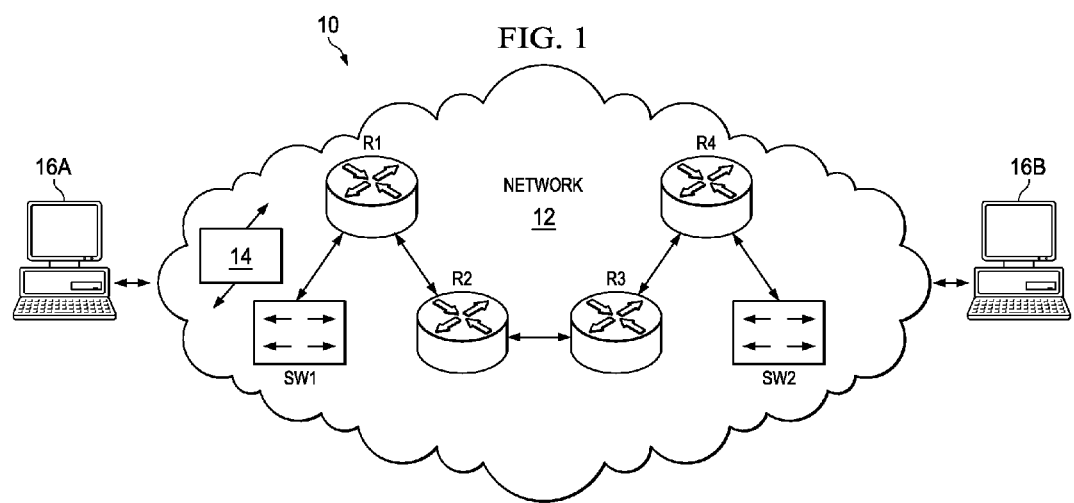
FIG. 1 is a simplified block diagram of a communication system in which a technique for providing performance analysis of a VPN segment on a per flow basis in accordance with one embodiment may be implemented.

FIG. 1 is a simplified block diagram of an example communication system 10 for monitoring network performance by analyzing the performance of a VPN segment on a per flow basis. Communication system 10 includes a communications network 12 comprising a plurality of network nodes, devices and/or elements, including for example switches SW1 and SW2, and routers R1, R2, R3, and R4, selectively interconnected by one or more types of communications links. For example, the communications links may be wired links or shared media, such as wireless links. Certain ones of the network nodes may be in communication with other ones of the nodes (e.g., based on physical connectivity, distance, signal strength, current operational status, location, etc.). As previously noted, the network nodes may include devices such as switches, routers, servers, edge devices (e.g., provider edge or "PE" devices as well as customer edge or "CE" devices), computers, etc. As will be appreciated by those skilled in the art, each of the devices may be capable of receiving one or more packets 14, or frames, from and transmitting packets to other devices using predefined network communication protocols, such as various wired protocols and wireless protocols, where appropriate. In the context of embodiments described herein, a protocol includes a set of rules defining how the nodes interact with one another.

As shown in FIG. 1, various end user devices, represented in FIG. 1 by two devices, including first and second end user devices 16A, 16B, respectively, may communicate with one another via network 12. In general, end user devices 16A, 16B, may be implemented using any type of devices used to initiate a communication, such as a computer, a personal digital assistant ("PDA"), a laptop or electronic notebook, a cellular telephone, an IP telephone, an iPhone, an iPad, a Microsoft Surface, a Google Nexus, or any other device, component, element, or object capable of initiating voice, audio, or data exchanges within the system 10. End user devices 16A, 16B, may also be inclusive of a suitable interface to an end user, such as a microphone, a display, or a keyboard or other terminal equipment. End user devices 16A, 16B, may also include any device that seeks to initiate a communication on behalf of another entity or element, such as a program, a database, or any other component, device, element, or object capable of initiating a voice or a data exchange via network 12. In addition, each of the end user devices 16A, 16B, may be a unique element designed specifically for communications involving network 12.

It will be understood that, although only a limited number of nodes and devices are shown as comprising network 12, in actuality, any number of such nodes and devices may be deployed. Additionally, it will be recognized that, while network 12 is illustrated as having a certain orientation, the depiction thereof is merely an illustrative example and not meant to limit the scope of the disclosure herein.

The classic traceroute tool has become an essential tool for network engineers. Traceroute is able to discover layer-3 ("L3") nodes along the path toward a destination, which provides network operators with visibility about the path. In general, traceroute displays the route, or path and measures transit delays of packets across an IP network. A version of the traceroute command is available on a number of modern operating systems. In operation, a traceroute initiated at a source network node, or "initiator," sends a sequence of Internet Control Message Protocol ("ICMP") echo request packets addressed to a destination server. Determining the intermediate routers traversed by the packet involves adjusting a time-to-live ("TTL"), or hop limit, IP parameter. Routers decrement this parameter and discard a packet when the TTL value has reached zero, returning the ICMP error message "ICMP Time Exceeded". Traceroute works by increasing the TTL value of each successive set of packets sent. The first set of packets have a TTL value of 1, expecting that they are not forwarded by the first router. The next set have a TTL value of 2, so that the second router will send the error reply. This continues until the destination server receives the packets and returns an ICMP Echo Reply message.

Traceroute uses the returned ICMP messages to produce a list of routers that the packets have traversed. In some implementations, the traceroute utility can use User Datagram Protocol ("UDP") datagrams. In other implementations, TCP packets are used. All implementations of traceroute rely on ICMP packets being sent to the initiator, which may determine the delay value by comparing the time at which the request was sent and the time at which the response was received.

With the transition from Time Division Multiplex ("TDM") and/or Integrated Services Digital Network ("ISDN")/T1/Primary Rate Interface ("PRI") networks to Voice over IP ("VoIP") functionality, the ability to trace and/or monitor call detail records has diminished. Call signaling protocols like Session Initiation Protocol ("SIP") and the Skinny Call Control Protocol ("SKINNY") do not currently provide tools to trace and monitor real-time calls or to assess the quality of the call and flow with network statistics such as jitter, packet drops, and latency for voice and video applications. The MediaTrace feature of Cisco Systems, Inc.'s Medianet performance monitor is a traceroute-type software tool that enables path discovery and real-time monitoring of time sensitive applications, such as voice and video. Medianet performance monitor enables intermediate hops to analyze user Real-time Transport Protocol ("RTP") flows and generate performance statistics on these flows. However, even if the hop is performance monitor-enabled, it may not be able to analyze IP Service Level Agreements ("SLAs") if the traffic is being sent over a VPN connection. Due to the tunnel and associated encryption properties, the VPN may make the media flow "invisible" for the intermediate hop. The VPN thus limits the ability of Medianet-oriented tools to expose and monitor media calls and flows over VPN links, thus limiting the use of the tools to within the enterprise domain.

Network administrators are interested in monitoring calls, sessions, and individual flows between first end user device 16A and second end user device 16B for monitoring the quality of time-sensitive applications such as VoIP and video over IP calls. When a single call represents several individual flows, network administrators are interested in monitoring every single flow inbound and outbound without regard to the originating devices. As previously noted, Medianet and MediaTrace were developed to enable the real-time monitoring of time sensitive applications, such as voice and video. To enable some of these protocols to provide the monitoring and management information for the entire path, every node has to be capable of responding to a management request from the initiator. Even if a network node is Medianet-enabled, the node may not be able to report IP SLAs because traffic being sent over a VPN connection that is encrypted makes the call or media flow invisible for the intermediate nodes.

Figure 2:
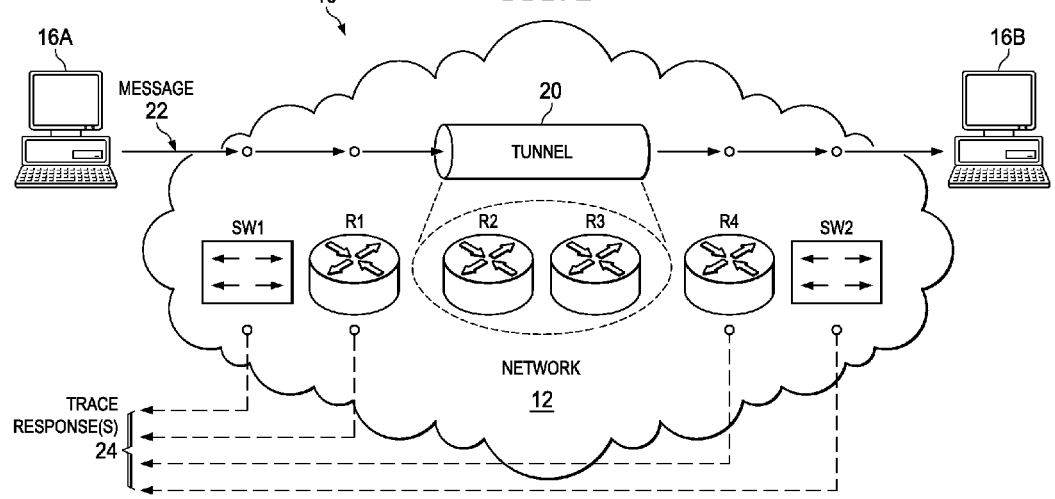
FIG. 2 is a more detailed block diagram of a communication system including a VPN tunnel in which a technique for providing performance analysis of a VPN segment on a per flow basis in accordance with one embodiment may be implemented.

FIG. 2 illustrates a simplified block diagram of communication system 10 in which a tunnel 20, which in one embodiment is a VPN tunnel, has been deployed along the path from end user device 16A to end user device 16B between the routers R1 and R4. In the illustrated embodiment, the router R1 is the "head end node" or "head" of tunnel 20. The router R4 is the "tail end node" or "tail" of tunnel 20. Routers R2 and R3 are deployed within tunnel 20 as "intermediate nodes," but are unable to respond to a MediaTrace request from an initiator as it is sent via the tunnel. Accordingly, a MediaTrace report generated at the initiator will include statistics for S1, R1, R4, and SW2, but there will be no discovery and no network performance metrics for R2 and R3.

In accordance with features of one embodiment, end user device 16A originates and sends a message 22, which may comprise packet 14 (FIG. 1), through network 12 to end user device 16B. In one embodiment, message 22 may comprise a trace request, as further described in detail below. Illustratively, the message may be forwarded by the switch SW1 to the router R1. The router R1, as the head of tunnel 20, encapsulates the message as will be described and inserts it into tunnel 20. The message traverses tunnel 20 via routers R2 and R3 to the VPN tail (router R4). The router R4 receives the message, decapsulates it, and forwards it on to the switch SW2 to reach the destination (e.g., end user device 16B). It should be noted that that various tunneling protocols may use penultimate hop popping, in which R3 removes the tunnel encapsulation prior to forwarding to the tail (router R4). Those skilled in art will appreciate that the view shown in FIG. 2 is merely for illustration and is not to be construed to limit the present disclosure. It will be appreciated that tunnel 20 may comprise any number and arrangement of nodes.

As noted above, traditional methods of monitoring network performance include various tools that enable the path discovery and real-time monitoring of the time sensitive applications such as voice and video. Examples of such protocols comprise media-based performance monitors (e.g., a "media trace" message protocol), Internet Control Message Protocol (ICMP) traceroute, multi-protocol label switching (MPLS) operations administration maintenance (OAM), Ethernet-OAM (E-OAM), discovery protocols, etc. Such tools allow for the analysis of traffic, as well as comparison against service level agreements (SLAs) and generation of performance statistics.

However, as discussed above, tunnels typically prevent intermediate node monitoring, since the tunnel (including encryption properties) essentially hides traffic thereby making data or media flow invisible for intermediate nodes. In this fashion, tunnels (e.g., VPNs) limit the ability of performance tools to expose and monitor traffic over intermediate nodes, thus limiting the tools effectiveness.

As an illustrative example, the known connection control signaling protocol "Q.931" (ITU-T Recommendation Q.931) provides conventional signaling for Integrated Services Digital Network (ISDN) communications applications, and facilitates setup and termination of connections. In conventional Q.931 networks, a call can be traced end-to-end, and quality of service parameters for the voice call can be determined. However, with the transition from time division multiplexing (TDM) or ISDN (or others, such as T1, primary rate interface (PRI), etc.) to voice over Internet Protocol (VoIP) functionality, the ability to trace or monitor call details in real-time has diminished. In particular, with the onset of various tunneling protocols (e.g., VPNs), traditional call signaling protocols (e.g., session initiation protocols (SIP)) and network terminal control protocols can no longer provide end-to-end tracing functionality, real-time call monitoring, or quality of service (QoS) parameters determinations, such as the quality of a call, flow of network statistics, jitter, packet drops, latency, etc.

Referring still to FIG. 2, assuming that message 22 is forwarded through network 12 as a type of "trace request", such as a MediaTrace request (an application-layer trace request), a traceroute (a time-to-live or TTL-based ping request), for example, each node/device along the path of the trace request receives the message and generates and transmits a "trace response" 24 to the trace initiating device (in this case, end user device 16A). However, as mentioned above, when trace request message 22 is forwarded via the routers R2 and R3 while within tunnel 20 as shown, no trace response is generated; rather, message 22 is merely forwarded on to the router R4 since the trace requests, because they are encapsulated, are invisible to the nodes within the tunnel (i.e., the routers R2 and R3). Moreover, even if various monitoring is enabled and capable of examining real-time transport (RTP) network traffic over tunnels/VPN networks, the monitoring will not monitor intermediate nodes since the IP address of the requestor will be encrypted and protected within tunnel 20. Thus, there will be no discovery and no network performance measurements of R2 and R3 under ordinary circumstances.

A technique has been developed for exposing User Datagram Protocol ("UDP") and RTP headers of a packet in the clear; that is, before application of the Encapsulating Security Protocol ("ESP") header that encapsulates the entire IP packet, so that they can be examined without requiring the packet to be decapsulated. This method is similar to the IP header copy up used with the GETVPN Tunnel Header Preservation. While this technique addresses the performance visibility issue with regard to performance monitoring at intermediate nodes of a VPN tunnel, at the same time, it exposes flow information (IP and flow information specifics) and the internal addressing scheme of the protected traffic, which may not be acceptable in many instances.

Figure 3:
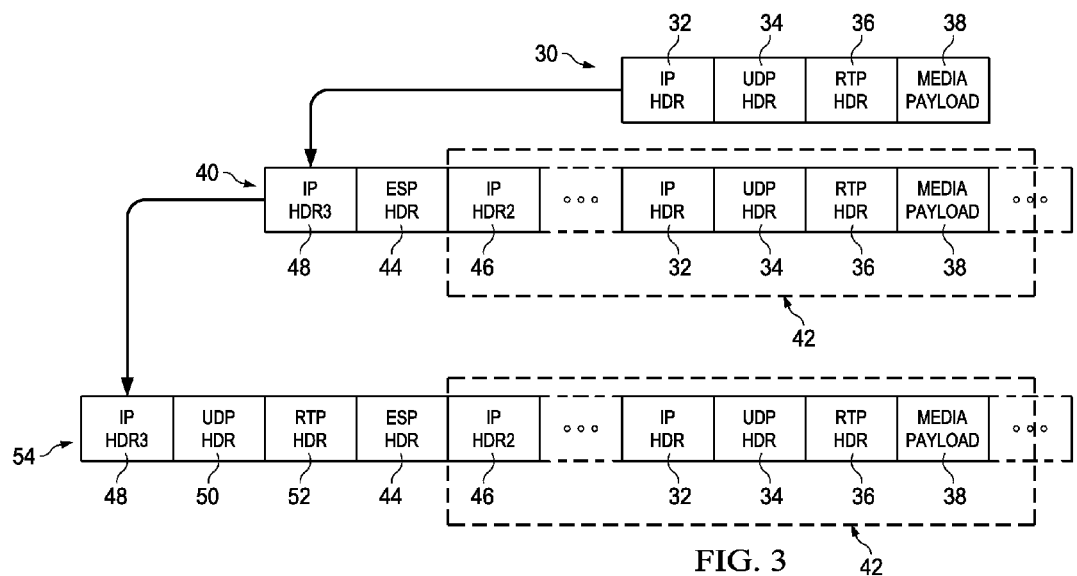
FIG. 3 illustrates an example transport packet configured for implementing a technique for providing performance analysis of a VPN segment on a per flow basis in accordance with one embodiment.

In one embodiment, encryption of an IP packet at a VPN head is performed by encapsulating the packet using a security protocol, such as IPsec, and a transport protocol to generate a transport packet. Referring to FIG. 3, illustrated therein is a simplified diagram of an IP packet 30. IP packet 30 comprises an IP header 32, a UDP header 34, an RTP header 36, and a payload 38. A router serving as a VPN head may encapsulate packet 30 using a security protocol, such as IPsec, and a transport protocol to create a transport packet 40. Transport packet 40 may include an encrypted portion 42, and may include an ESP header ("HDR") 44 for authenticating packet and an IP HDR2 46 comprising transport information for use after the tunnel.

In accordance with one embodiment, an IP HDR3 48 of packet 40 may be provided for purposes described below. Additionally, a second UDP HDR 50 and a second RTP HDR 52 are added to the transport packet "in the clear" (i.e., outside the encrypted portion) to obtain a modified transport packet 54 for use in connection with the present embodiments, as described in detail below.

In accordance with features of embodiments described herein, rather than copying up the exact contents of the IP, UDP, and RTP headers, the head of a VPN tunnel does not employ IP header preservation and is, instead, directs the packet to the tail of the tunnel using explicit IP destination addressing by placing that the address of the VPN tail in the IP HDR3 of the packet. Additionally, instead of copying up the original UDP and RTP header fields, new "anonymized" UDP and RTP header fields are created for the packet and included as UDP HDR 50 and RTP HDR 52. In this manner, the anonymized fields are located in the clear (i.e., unencrypted/unencapsulated) portion of the packet such that they are accessible by intermediate nodes.

The VPN head may maintain a UDP/RTP field-mapping table mapping the important UDP and RTP header fields, such as Layer 4 ports and RTP SSRC, to new values for those fields. The new values may be random with an index back to the original fields maintained in the mapping table at the VPH head. For example, an extreme case would have the new UDP port numbers tied to UDP src=1234 and UDP dest=1234 used for all flows while the RTP SSRC field is used (much like port address translation) as an index back to the original flow. From a performance-monitoring standpoint, most importantly, the RTP sequence number and timestamp field are either carried over from the original or recreated such that the same loss and jitter measurements would be generated.

The newly formatted VPN packet will be forwarded towards the VPN tail. The anonymized UDP and RTP headers in the clear are used to update a cache that maps between the real UDP and RDP headers (available after decryption of the packet at the tail end node) and the anonymized ones.

The remapping of the copied up UDP and RTP header fields as described herein retains the confidentiality of the original addressing and flows. The VPN head may choose to change the mapping at any point, the monitoring can continue, and the VPN tail end node just updates its mapping cache based on what it observes when the packet is decrypted. Such on-demand remapping can provide an additional level of security.

Techniques have been developed for rendering a trace request visible to intermediate nodes along tunnels (e.g., within secured networks using VPN tunnels). In particular, at least one technique provides for splitting, or forking, a trace request at a head of a tunnel, and sending two traces. One of the two traces is an in-tunnel trace request, which is sent within the tunnel (e.g., encapsulated) to the tail of the tunnel; the other trace request is an out-of-tunnel trace request (e.g., IP-routed or unencapsulated), which is sent to subsequent nodes along the path of, but outside, the tunnel. Since the out-of-tunnel trace request is transmitted to each subsequent node along the path of the tunnel without being inserted into the tunnel, the request is visible to the nodes, causing them to generate trace responses.

Figure 4:
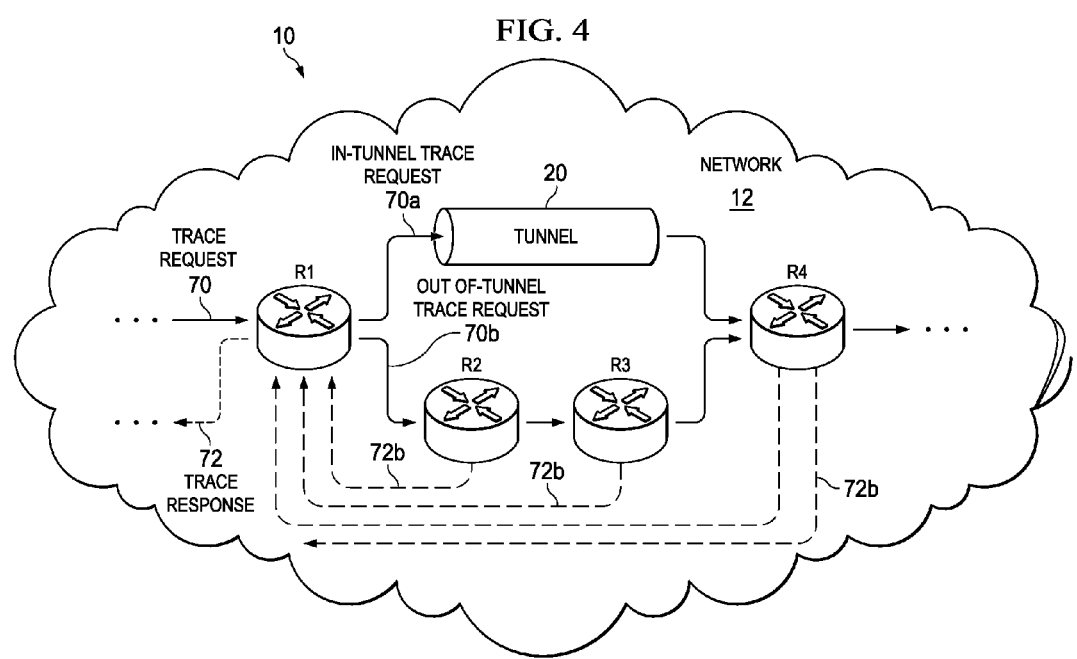
FIG. 4 is a another detailed block diagram of a communication system including a VPN tunnel for illustrating a technique for providing performance analysis of a VPN segment on a per flow basis in accordance with one embodiment.

Referring now to FIG. 4 in accordance with features of embodiments described herein, a trace request 70 received at the head node (router R1) of tunnel 20 is "forked," as described in detail hereinbelow. The original trace request, referred to herein as an "in-tunnel trace request," 70a will continue to follow the path via the tunnel. The in-tunnel trace request provides encapsulation fields to the header of the message and is, thus, invisible (meaning, at least obscured) to the intermediate routers R2 and R3. In accordance with the techniques described herein, a forked trace request), referred to as an "out-of-tunnel trace request" 410b, is generated by the tunnel head node (router R1) directly toward the tail node (router R4) of the tunnel (e.g., without being encapsulated into the tunnel). As shown in FIG. 4, the out-of-tunnel trace request may be used to perform discovery of the subsequent nodes along the tunnel path (e.g., routers R2 and R3) as well as gather performance information (e.g., Quality of Service (QoS) parameters).

As shown in FIG. 4, assume that a trace initiator, such end user device 16A (FIG. 2), generates trace request 70 to another network node, such as end user device 16B (FIG. 2). Once the router R1 receives trace request 70, the router R1 operates as a trace responder, a trace initiator, and a trace proxy. In particular, the router R1 may send a trace response 72 to the trace initiator, forward the original trace request over the tunnel, and, as described in detail below, generate an out-of-tunnel trace request 70b for the tunnel tail-end node (R4) without using the tunnel (e.g., IP routed toward R4). In this manner, intermediate nodes comprising routers R2 and R3 both receive out-of-tunnel trace request 70b, and respond with generated trace responses 72b to router R1.

The tail of tunnel 20 (router R4) may eventually receive both the in-tunnel trace request, as well as the out-of-tunnel trace request, and may respond to each independently (e.g., the response 72a to the trace initiator for in-tunnel trace request 70a, and a response to the tunnel head (router R1) for the out-of-tunnel trace request). Note that SW2 and end user device 16B (FIG. 2) may each also receive the original in-tunnel trace request, and may respond directly to the trace initiator similar to response.

The router R1 may then forward any trace responses 72a to the in-tunnel trace request 70a to the trace initiator and may add identifiers for the tunnel head (router R1) and tail (router R4), accordingly. In addition, router R1 receives the trace responses to out-of-tunnel trace request 70b and may relay them toward the original trace initiator. In particular, as noted above, the forked trace request to the tunnel forwarding nodes (subsequent intermediate nodes) is illustratively a conventional trace message (media trace or traceroute) with the initiator and source as the tunnel head-end node and the destination as the tunnel tail-end node. As such, the trace responders send their responses to the tunnel head R1. Router R1 may then either relay the responses individually to the original trace initiator (if configured to interpret the additional responses), or illustratively, may merge and forward the responses to the original trace initiator with additional information regarding the fork, as well as the tunnel head and tail nodes. In other words, the head node can aggregate each of the trace responses (e.g., aggregate the in-tunnel trace response and the out-of-tunnel trace response(s)) into a single response, or aggregate only the out-of-tunnel trace response(s) into a single response), and transmit the aggregated response to a trace request initiator.

In accordance with embodiments described herein, when the trace request arrives at the tunnel head (router R1), the tunnel head will translate the trace request based on a mapping table maintained at the tunnel head, so that the specific flow being traced in the VPN transit region comprising the intermediate nodes (routers R2 and R3) is based on the anonymized headers. The translation of the request at the tunnel head coupled with the UDP and RTP headers being provided in packets in the clear enables nodal flow level statistics to be compiled in the VPN transit region. At the same time, the anonymization of the public headers provides for confidentiality of sender and receivers. The intermediate routers will send their responses to the tunnel head, which will forward them to the original initiator.

Figure 5:
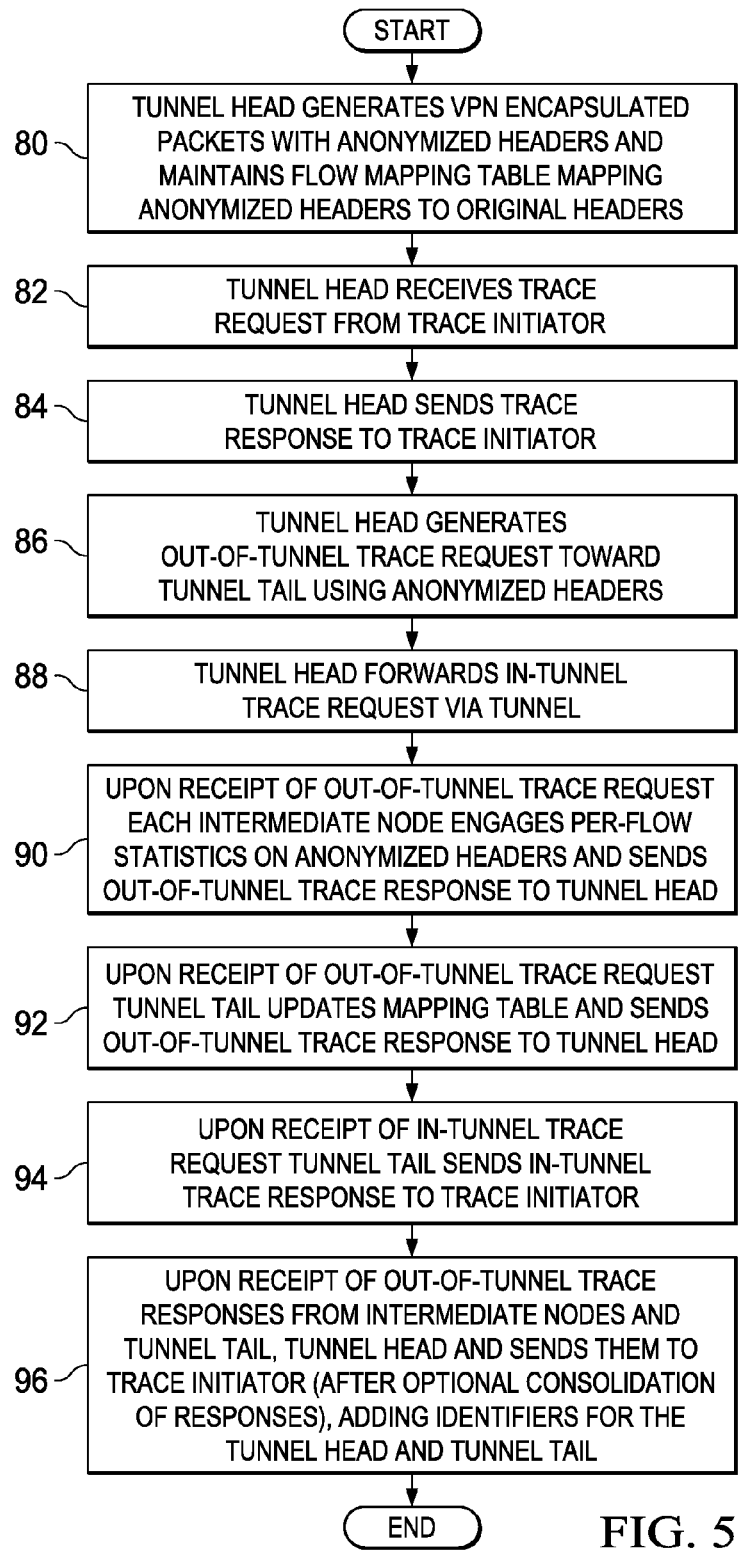
FIG. 5 is a flowchart of a technique for providing performance analysis of a VPN segment on a per flow basis in accordance with embodiments described herein.

FIG. 5 illustrates a flowchart of a technique for providing performance analysis of a VPN segment on a per flow basis in accordance with embodiments described herein. As shown in FIG. 5, in 80, the tunnel head generates VPN encapsulated packets with anonymized UDP and RTP headers and maintains a flow-mapping table mapping the anonymized headers to the original headers. In 82, the tunnel head receives a trace request from a trace imitator. In 84, the tunnel head (functioning as a trace responder) sends a trace response to the trace initiator. In 86, the tunnel head (functioning as a trace imitator) generates an out-of-tunnel trace request toward the tail of the tunnel using anonymized headers obtained from the mapping table maintained at the tunnel head. In 88, the tunnel head forwards the in-tunnel trace request via the tunnel in a conventional fashion. In 90, upon receipt of the out-of-tunnel trace request from the tunnel head, each intermediate node engages per-flow statistics on the anonymized headers and sends an out-of-tunnel trace response to the tunnel head. The out-of-tunnel trace response includes an identification of the node and the per-flow statistics determined at the node.

In 92, upon receipt of the out-of-tunnel trace request, the tunnel tail updates its mapping cache and sends an out-of-tunnel trace response to the tunnel head. The out-of-tunnel trace response from the tail may include performance information measured from the outer (anonymized) headers and may indicate that the tail is actually monitoring the external headers rather than the original (decapsulated flow). In 94, upon receipt of the in-tunnel trace request, the tunnel tail sends an in-tunnel trace response to the trace initiator. In 96, upon receipt of out-of-tunnel trace responses from the intermediate node(s) and the tunnel tail, the tunnel head sends the out-of-tunnel trace responses to the trace initiator, after optionally consolidating the responses. The tunnel head also adds flow identifiers based on the anonymized headers for the tunnel head and tunnel tail.

As the VPN head and VPN tail are working in conjunction, it is possible to optionally remove the need for the trace request forking at the VPN head. In this scenario, the head would perform the translation of the trace request and forward it along the outer path toward the VPN tail. The VPN tail router, upon receipt of the trace request, would translate it back into original form (based on its mapping cache). During the VPN transit portion, the trace responses would go to the public address of the VPN head, which would then forward them to the trace initiator. At the retranslation point (VPN tail), the trace responses would revert back to the trace initiator. When trace forking is not used, the VPN transit legs of the trace request packet would need a new field encoded with the address of the original trace initiator. This field is not used by the VPN transit nodes; rather, it is preserved for use by the VPN tail so that it can recompose a post-VPN trace request that will generate responses to the original trace initiator.

Explicit UDP and RTP headers are not absolutely required; all that is required is a unique flow identifier, a time stamp, and a packet sequence field. For purposes of the embodiments described herein, UDP and RTP encoding have been used because MediaTrace already works with UDP and RTP encoding. As the purpose of the copied up UDP and RTP headers is only to allow measurement at the flow level, the VPN head may choose to only add the anonymized headers at the time of a trace request and to stop adding them at the end of the MediaTrace procedure.

Figure 6:
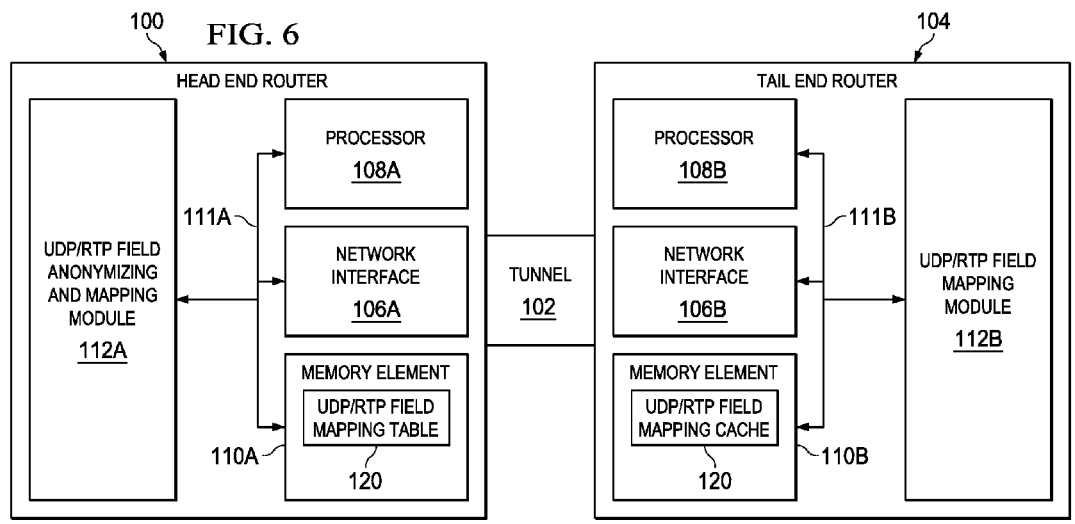
FIG. 6 is a simplified block diagram illustrating an example configuration of a head end node and tail end node connected to a tunnel in accordance with embodiments described herein for providing performance analysis of a VPN segment on a per flow basis.

FIG. 6 is a simplified block diagram of an example VPN tunnel arrangement comprising a first node 100 comprising a head end of a tunnel 102 and a second node 104 comprising a tail end of the tunnel. In one embodiment, first and second nodes 100, 104, are routers. Each node 100, 104, may comprise one or more wired or wireless network interfaces 106A, 106B, at least one processor 108A, 108B, and a memory element 110A, 110B, interconnected by a system bus 111A, 111B.

Network interfaces 106A, 106B, can comprise the mechanical, electrical, and signaling circuitry for communicating data over a network and may be configured to transmit and/or receive data using a variety of different communication protocols. Note that each node 100, 104, may include one or more different types of network interfaces, and that the view herein is merely for illustration. Each of memory elements 110A, 110B, can comprise a plurality of storage locations that are addressable by the respective one of the processors 108A, 108B, and network interfaces 106A, 106B, for storing software programs and data structures associated with the embodiments described herein. Each of processors 108A, 108B, may comprise hardware elements or hardware logic adapted to execute the software programs, such as embodied in respective modules 112A, 112B, and manipulate data structures in respective memory element 110A, 110B. Each of modules 112A, 112B, may comprise processes and/or services as described herein.

As previously described, head end node 100 includes a UDP/RTP Header Mapping Table 120, which may be stored in memory element 110A. Similarly, and as also previously described, tail end node 104 includes a UDP/RTP Header Mapping Cache 122, which may be stored in memory element 110B.

It should be noted that much of the infrastructure discussed herein can be provisioned as part of any type of network device. As used herein, the terms "network device", "network element", and "node" can encompass computers, servers, network appliances, hosts, routers, switches, gateways, tail end nodes, head end nodes, bridges, virtual equipment, load-balancers, firewalls, processors, modules, or any other suitable device, component, element, or object operable to exchange information in a communications environment. Moreover, the network devices may include any suitable hardware, software, components, modules, interfaces, or objects that facilitate the operations thereof. This may be inclusive of appropriate algorithms and communication protocols that allow for the effective exchange of data or information.

In one implementation, these devices can include software to achieve (or to foster) the activities discussed herein. This could include the implementation of instances of any of the components, engines, logic, modules, etc., shown in the FIGURES. Additionally, each of these devices can have an internal structure (e.g., a processor, a memory element, etc.) to facilitate some of the operations described herein. In other embodiments, the activities may be executed externally to these devices, or included in some other device to achieve the intended functionality. Alternatively, these devices may include software (or reciprocating software) that can coordinate with other elements in order to perform the activities described herein. In still other embodiments, one or several devices may include any suitable algorithms, hardware, software, components, modules, interfaces, or objects that facilitate the operations thereof.

Note that in certain example implementations, functions outlined herein may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as may be inherent in several devices illustrated in the FIGURES, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as may be inherent in several devices illustrated herein, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

The devices illustrated herein may maintain information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the computer elements can also include suitable interfaces for receiving, transmitting, and/or otherwise communicating data or information in a communications environment.

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, aspects of the present disclosure may take the form of a computer program product embodied in one or more non-transitory computer readable medium(s) having computer readable program code encoded thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or "Flash memory"), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object oriented programming language such as Java™, Smalltalk™ C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Note that with the example provided above, as well as numerous other examples provided herein, interaction may be described in terms of two, three, or four computer elements. However, this has been done for purposes of clarity and example only. In certain cases, it may be easier to describe one or more of the functionalities of a given set of flows by only referencing a limited number of system elements. It should be appreciated that systems illustrated in the FIGURES (and their teachings) are readily scalable and can accommodate a large number of components, as well as more complicated/sophisticated arrangements and configurations. Accordingly, the examples provided should not limit the scope or inhibit the broad teachings of illustrated systems as potentially applied to a myriad of other architectures.

It is also important to note that the steps in the preceding flow diagrams illustrate only some of the possible signaling scenarios and patterns that may be executed by, or within, the illustrated systems. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the illustrated systems in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   generating one or more Virtual Private Network ("VPN") encapsulated packets having anonymized headers;
   maintaining a table at a first network device configured to map the anonymized headers to original headers of the VPN encapsulated packets;
   receiving a trace request from an initiator;

generating, based at least in part on the received trace request, an out-of-tunnel trace request to be sent toward a second network device via at least one intermediate network device using the anonymized headers; and forwarding the received trace request as an in-tunnel trace request through a VPN tunnel.

2. The method of claim 1, further comprising:

updating a mapping cache with anonymized header information; and providing a response to the out-of-tunnel trace request to the first network device.

3. The method of claim 1, further comprising:

providing per-flow statistics on the anonymized headers; and sending a response to the out-of-tunnel trace request to the first network device.

4. The method of claim 1, further comprising:

sending received responses for the out-of-tunnel trace request to the initiator.

5. The method of claim 4, further comprising:

consolidating the received responses to the out-of-tunnel trace request prior to sending them to the initiator.

6. The method of claim 4, further comprising:

adding flow identifiers, which can be associated with the first network device and the second network device, to the received responses prior to sending them to the initiator.

7. The method of claim 1, wherein the anonymized headers are provided in unencrypted and unencapsulated portions of one or more packets that are accessible to the at least one intermediate network device.

8. The method of claim 1, wherein the first network device is associated with a head end of the tunnel and the second network device is associated with a tail end of the tunnel.

9. The method of claim 1, wherein the table is used to map one or more User Datagram Protocol (UDP) and Real-time Transport Protocol (RTP) header fields to new values for those fields, and wherein the table includes an index to one or more of the original headers.

10. One or more non-transitory tangible media that includes code for execution and when executed by a processor is operable to perform operations comprising:

generating one or more Virtual Private Network ("VPN") encapsulated packets having anonymized headers;

maintaining a table at a first network device configured to map the anonymized headers to original headers of the VPN encapsulated packets;

receiving a trace request from an initiator;

generating, based at least in part on the received trace request, an out-of-tunnel trace request to be sent toward a second network device via at least one intermediate network device using the anonymized headers; and forwarding the received trace request as an in-tunnel trace request through a VPN tunnel.

11. The media of claim 10, wherein the operations further comprise:

updating a mapping cache with anonymized header information; and providing a response to the out-of-tunnel trace request to the first network device.

12. The media of claim 10, wherein the operations further comprise:

providing per-flow statistics on the anonymized headers; and sending a response to the out-of-tunnel trace request to the first network device.

13. The media of claim 10, wherein the operations further comprise:

sending received responses for the out-of-tunnel trace request to the initiator.

14. The media of claim 13, wherein the operations further comprise:

consolidating the received responses to the out-of-tunnel trace request prior to sending them to the initiator.

15. The media of claim 10, wherein the operations further comprise:

adding flow identifiers, which can be associated with the first network device and the second network device, to the received responses prior to sending them to the initiator.

16. The media of claim 10, wherein the anonymized headers are provided in unencrypted and unencapsulated portions of one or more packets that are accessible to the at least one intermediate network device.

17. The media of claim 10, wherein the table is used to map one or more User Datagram Protocol (UDP) and Real-time Transport Protocol (RTP) header fields to new values for those fields, and wherein the table includes an index to one or more of the original headers.

18. An apparatus, comprising:

a memory element configured to store data;

a processor operable to execute instructions associated with the data; and a mapping module configured to interface with the processor and the memory element such that the apparatus is configured to:

generate one or more Virtual Private Network ("VPN") encapsulated packets having anonymized headers;

maintain a table to map the anonymized headers to original headers of the VPN encapsulated packets;

receive a trace request from an initiator;

generate, based at least in part on the received trace request, an out-of-tunnel trace request to be sent toward a network device via at least one intermediate network device using the anonymized headers; and forward the received trace request as an in-tunnel trace request through a VPN tunnel.

19. The apparatus of claim 18, wherein the anonymized headers are provided in unencrypted and unencapsulated portions of one or more packets that are accessible to the at least one intermediate network device.

20. The apparatus of claim 18, wherein the table is used to map one or more User Datagram Protocol (UDP) and Real-time Transport Protocol (RTP) header fields to new values for those fields, and wherein the table includes an index to one or more of the original headers.

* * * * *